United States Patent
Yun et al.

(10) Patent No.: US 10,680,923 B2
(45) Date of Patent: Jun. 9, 2020

(54) SEMICONDUCTOR DEVICE AND OPERATING METHOD THEREOF

(71) Applicant: Samsung Electronics Co., Ltd., Suwon-si, Gyeonggi-do (KR)

(72) Inventors: Jae Geun Yun, Suwon-si (KR); Seong Min Jo, Seoul (KR); Yun Kyo Cho, Suwon-si (KR); Byeong Jin Kim, Seoul (KR); Dong Soo Kang, Hwaseong-si (KR); Nak Hee Seong, Gwacheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 580 days.

(21) Appl. No.: 15/427,522

(22) Filed: Feb. 8, 2017

(65) Prior Publication Data

US 2017/0237636 A1  Aug. 17, 2017

(30) Foreign Application Priority Data

Feb. 11, 2016 (KR) .................. 10-2016-0015470

(51) Int. Cl.
  *G06F 11/07* (2006.01)
  *G06F 11/30* (2006.01)
  *H04L 12/26* (2006.01)
  *H04L 12/24* (2006.01)

(52) U.S. Cl.
  CPC .......... *H04L 43/0858* (2013.01); *H04L 41/06* (2013.01); *H04L 43/0876* (2013.01)

(58) Field of Classification Search
  None
  See application file for complete search history.

(56) References Cited

U.S. PATENT DOCUMENTS

| 6,937,961 B2 | 8/2005 | Cabral et al. |
| 7,020,808 B2 | 3/2006 | Sato et al. |
| 7,571,076 B2 | 8/2009 | Matsuzaki et al. |

(Continued)

FOREIGN PATENT DOCUMENTS

JP    2014/052962 A    3/2014

OTHER PUBLICATIONS

Schlansker et al., "High-Performance Ethernet-Based Communications for Future Multi-Core Processors", Nov. 2007, ACM (Year: 2007).*

*Primary Examiner* — Hyun Nam
(74) *Attorney, Agent, or Firm* — Harness, Dickey & Pierce, P.L.C.

(57) ABSTRACT

A semiconductor device and an operating method thereof are provided. An operating method of a semiconductor device, includes monitoring a plurality of request packets and a plurality of response packets that are being transmitted between a master device and a slave device; detecting a target request packet that matches desired identification (ID) information from among the plurality of request packets; counting the number of events of a transaction including the target request packet by using an event counter; counting the number of request packets whose corresponding response packets are yet to be detected, from among the plurality of request packets by using a Multiple Outstanding (MO) counter, determining whether an MO count value of the MO counter is valid; and if the MO count value is invalid, resetting the event counter.

20 Claims, 10 Drawing Sheets

(56) References Cited

U.S. PATENT DOCUMENTS

| | | |
|---|---|---|
| 8,041,901 B2 | 10/2011 | Snyder |
| 8,214,628 B2 | 7/2012 | Hirai et al. |
| 8,346,509 B2 | 1/2013 | Davies |
| 2004/0064290 A1* | 4/2004 | Cabral .................. G06F 11/348 702/182 |
| 2005/0204397 A1* | 9/2005 | Miyazoe .................. H04B 3/46 725/107 |
| 2007/0083643 A1* | 4/2007 | Arndt ...................... H04L 43/00 709/224 |
| 2007/0195761 A1* | 8/2007 | Tatar ................... H04L 49/1546 370/389 |
| 2008/0154803 A1* | 6/2008 | Stein .................. H03M 7/4006 706/1 |
| 2008/0279133 A1* | 11/2008 | Bienfait .................. H04W 8/18 370/315 |
| 2009/0059943 A1* | 3/2009 | Nonomura .......... G06F 13/4045 370/419 |
| 2012/0046912 A1 | 2/2012 | Indukuru et al. |
| 2012/0227045 A1* | 9/2012 | Knauth ................ G06F 9/3863 718/100 |
| 2014/0149078 A1* | 5/2014 | Lee .................... G06F 11/3409 702/186 |
| 2015/0109916 A1* | 4/2015 | Locatelli ........... G06F 15/17312 370/230 |
| 2015/0170238 A1* | 6/2015 | O'Malley .......... G06Q 30/0611 705/26.4 |

\* cited by examiner

1200

1300

1400

SEMICONDUCTOR DEVICE AND OPERATING METHOD THEREOF

This U.S. non-provisional application claims the benefit of priority to Korean Patent Application No. 10-2016-0015470, filed on Feb. 11, 2016 in the Korean Intellectual Property Office (KIPO), the disclosure of which is incorporated herein by reference in its entirety.

BACKGROUND

1. Field of the Disclosure

At least some of the example embodiments relate to a semiconductor device and/or an operating method thereof.

2. Description of the Related Art

A System-on-Chip (SoC) enables data transmissions between various Intellectual Property (IP) blocks using high-performance On-Chip Interconnects (OCIs). The OCIs may transmit multiple transactions between various IP blocks and/or devices, etc., for example, an arbitrary master device and a slave device. A channel formed between the master device and the slave device may be monitored by a monitoring device for the purpose of, for example, performing debugging, Quality-on-Service (QoS) control, or the tracking of occurrences of a particular event defined by a user.

SUMMARY

At least one example embodiment of the present disclosure provides an operating method of a semiconductor device for correcting an event occurrence value in a channel formed between the master device and the slave device of a System-on-Chip (SoC).

At least one example embodiment of the present disclosure also provides a semiconductor device for correcting an event occurrence value in a channel formed between the master device and the slave device of an SoC.

However, the various example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to at least one example embodiment of the present disclosure, there is provided an operating method of a semiconductor device, the method including monitoring a plurality of request packets and a plurality of response packets transmitted between at least one master device and at least one slave device, detecting a target request packet that matches desired identification (ID) information from among the plurality of request packets, counting a number of events of a transaction based on the target request packet using an event counter, counting a number of request packets whose corresponding response packets have not been detected from among the plurality of request packets using a Multiple Outstanding (MO) counter, determining whether an MO count value of the MO counter is valid, and if the MO count value is invalid, resetting the event counter.

According to at least one other example embodiment of the present disclosure, there is provided an operating method of a semiconductor device, the method including monitoring a plurality of request packets and a plurality of response packets between a first intellectual property (IP) block and a second IP block, the first IP block and second IP block included in a system-on-chip (SoC), receiving desired first ID information and desired second ID information, counting a number of events of a first transaction from the plurality of request packets and the plurality of response packets that matches the first ID information using an event counter, counting a number of events of a second transaction from the plurality of request packets and the plurality of response packets that that matches the second ID information using the event counter, counting a number of outstanding request packets whose corresponding response packets have not been detected from among the plurality of request packets by using an MO counter, determining whether an MO count value of the MO counter is valid, and if the MO count value is invalid, resetting the event counter.

According to at least one example embodiment of the present disclosure, there is provided a semiconductor device, the semiconductor device including an event monitor configured to detect a target request packet that matches desired ID information from among a plurality of request packets that are being transmitted between at least one master device and at least one slave device, an event counter configured to count a number of events of a transaction including the target request packet, an MO counter configured to count a number of request packets whose corresponding response packets have not been detected from among the plurality of request packets, and an event value checker configured to determine whether an MO count value of the MO counter is valid.

According to at least one example embodiment of the present disclosure, there is provided a method of monitoring a channel of a semiconductor device, the method including sampling packet transmissions over the channel of the semiconductor device, the packet transmissions including a plurality of request packets and a plurality of response packets, detecting whether a request packet from the sampled plurality of request packets matches a target request packet based on a desired transaction ID, detecting whether a response packet from the sampled plurality of response packets matches a target response packet based on the desired transaction ID, updating a count of a number of transaction events completed based on the detecting of the request packet and the detecting of the response packet, determining whether the count of the number of transaction events completed is valid, and outputting the count of the number of transaction events to a debugging destination based on results of the determining.

Other features and aspects will be apparent from the following detailed description, the drawings, and the claims.

BRIEF DESCRIPTION OF THE DRAWINGS

The above and other aspects and features of the inventive concepts will become more apparent by describing in detail various example embodiments thereof with reference to the attached drawings, in which like reference characters refer to like parts throughout the different views. The drawings are not necessarily to scale, emphasis instead being placed upon illustrating principles of inventive concepts. In the drawings.

DETAILED DESCRIPTION

Figure 1:
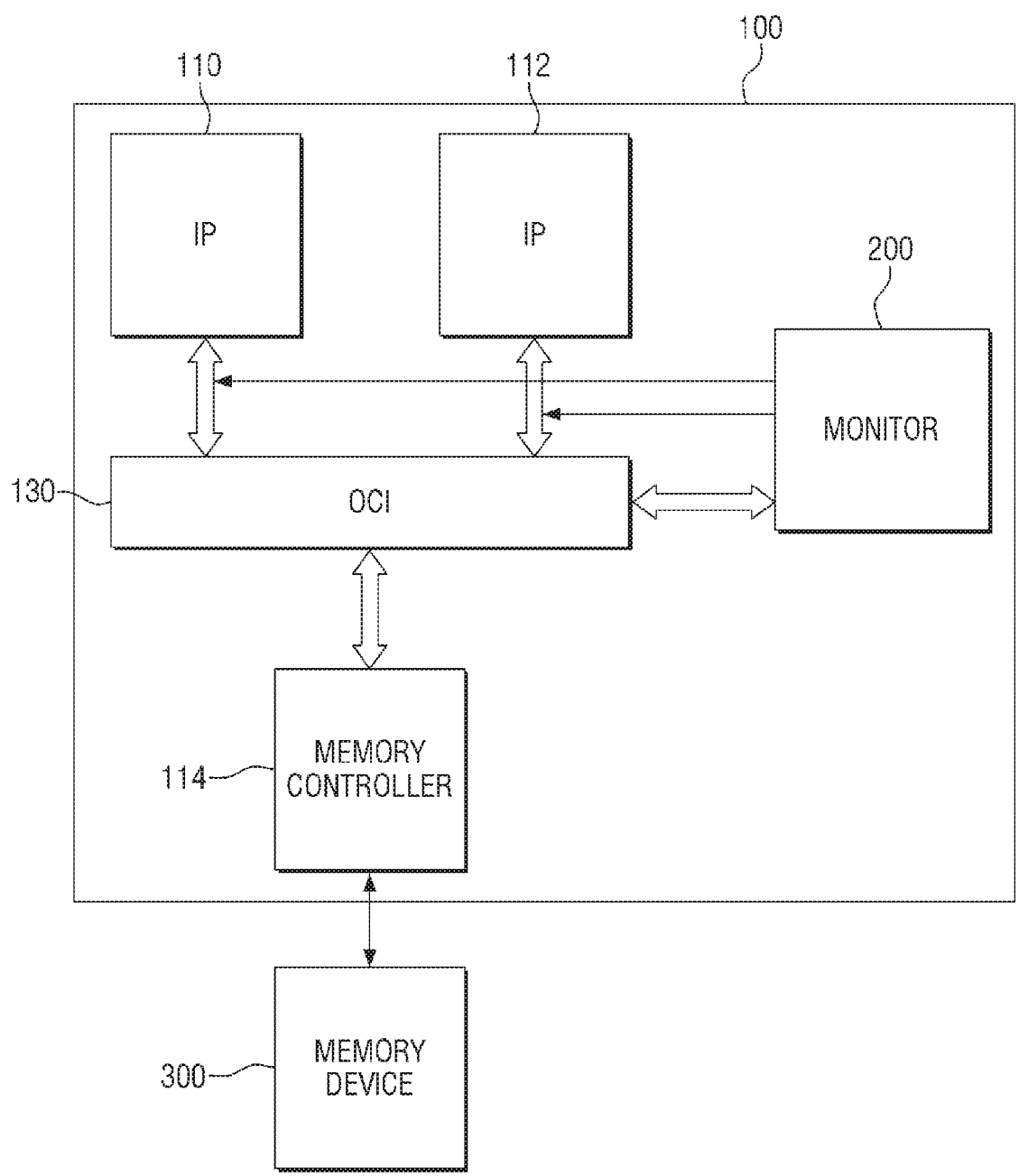
FIG. 1 is a schematic block diagram of a semiconductor device according to at least one example embodiment of the present disclosure.

Various example embodiments will be described in detail with reference to the accompanying drawings. The inventive concepts, however, may be embodied in various different forms, and should not be construed as being limited only to the illustrated example embodiments. Rather, these example embodiments are provided as examples so that this disclosure will be thorough and complete, and will fully convey the concept of the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Advantages and features of the present disclosure and methods of accomplishing the same may be understood more readily by reference to the following detailed description of various example embodiments and the accompanying drawings.

FIG. 1 is a schematic block diagram of a semiconductor device according to at least one example embodiment.

Referring to FIG. 1, a semiconductor device 100 includes one or more Intellectual Property (IP) blocks 110 and 112 and a monitoring device 200. In some example embodiments, the semiconductor device 100 may further include a memory controller 114, and the memory controller 114 may also be implemented as an IP block.

The semiconductor device 100 is an Integrated Circuit (IC) including computer and/or processing elements such as a processing unit, a controller, an interface, a memory, and the like. For example, the semiconductor device 100 may include a System-on-Chip (SoC). The computer and/or processing elements may be implemented as IP blocks. Examples of the IP blocks 110 and 112 may include a Central Processing Unit (CPU) and a Graphic Processing Unit (GPU), but the example embodiments are not limited thereto.

The IP blocks 110 and 112 and the memory controller 114 may be implemented on a single silicon die, and may exchange data with each other via an on-chip interconnect (OCI) 130, but are not limited thereto. The memory controller 114 may control at least one memory device 300.

The monitoring device 200 monitors (e.g., analyzes, observes, inspects, etc.) transactions between the IP blocks 110 and 112 and the memory controller 114, which exchange data and/or messages with each other via the OCI 130. By monitoring data and/or messages exchanged via the OCI 130, channels formed between the IP blocks 110 and 112 and the memory controller 114 may be debugged, Quality of Service (QoS) may be controlled, and/or the occurrence of a particular event defined by a user (e.g., a desired event) may be tracked.

The monitoring device 200 may perform transaction monitoring at any desired location in the semiconductor device 100. As illustrated in FIG. 1, the monitoring device 200 may monitor a transaction associated with the IP Block 110 and/or a transaction associated with the IP block 112. However, the locations at which the monitoring device 200 performs transaction monitoring are not limited to those locations illustrated in FIG. 1, and may include various other arbitrary locations inside the semiconductor device 100 depending on the desired and/or intended use of the semiconductor device 100, such as monitoring the transactions of the memory controller, the memory device, other IP blocks, computer elements, processing elements, units, etc., that may be included in the semiconductor device 100.

A transaction includes a request packet and a response packet. For example, a read transaction and a write transaction may occur between the IP block 110, which operates as a master device, and the memory controller 114, which operates as a slave device, in this example. More specifically, for a read transaction, in response to the IP block 110 transmitting a read request packet to the memory controller 114 to initiate the transaction, the memory controller 114 may transmit a read response packet to the IP block 110 as a response to the read request packet to complete the transaction.

In a case in which a plurality of master/slave relationships are established in the semiconductor device 100 and/or a plurality of tasks are allocated to a single master/slave relationship, a plurality of transactions may be monitored in the semiconductor device 100 by the monitoring device 200. In this case, a plurality of request packets and a plurality of response packets may be transmitted between the IP block 110 (e.g., a master device) and the memory controller 114 (e.g., a slave device).

In some example embodiments, each of the plurality of request packets and the plurality of response packets may include identification (ID) information. More specifically, each of the plurality of request packets and the plurality of response packets may include at least one of transaction ID information and transaction attribute information that may be used to uniquely identify each transaction. For example, the transaction ID information may include unique ID information for identifying the packet, a master device and/or a slave device (e.g., source and/or destination information for the data, message, and/or transaction), and the transaction attribute information may include additional information related to the transaction, such as burst length attribute information, cache snooping type attribute information, etc. If there exists a plurality of transactions, each of the plurality of transactions may be identified using the transaction ID information and the transaction attribute information.

Figure 2:
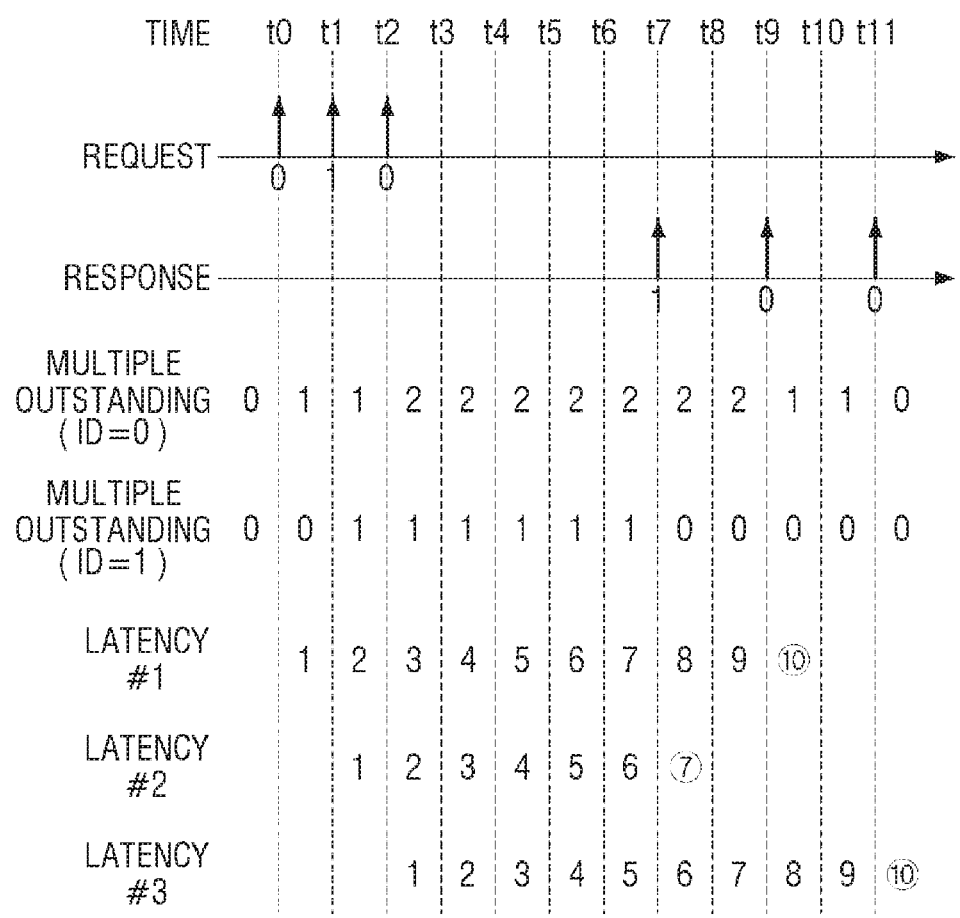
FIG. 2 is a timing diagram for explaining how to count events in a channel formed between a master device and a slave device of the semiconductor device according to the at least one example embodiment of FIG. 1.

FIG. 2 is a timing diagram for explaining how to count events in a channel formed between a master device and a slave device of the semiconductor device according to some example embodiments, such as the example embodiment of FIG. 1.

More specifically, FIG. 2 illustrates the results of performing transaction monitoring at a desired location in the semiconductor device 100 by using the monitoring device 200. Latency counting will hereinafter be described with reference to FIG. 2, taking, as an example, an event that occurs in a channel formed between a master device and a slave device, but the example embodiments are not limited thereto.

Referring to FIG. 2, three request packets having transaction IDs of 0, 1, and 0 are sequentially detected at times t0, t1, and t2, respectively. At a time t7, a response packet corresponding to the request packet detected at the time t1 with a transaction ID of 1 is detected. Additionally, response packets corresponding to the request packets detected at the times t0 and t2 with a transaction ID of 0 are detected at times t9 and t11, respectively.

When a plurality of response packets are detected, according to at least one example embodiment as illustrated in FIG. 2, they can be identified by their respective transaction IDs if they correspond to request packets having different transaction IDs. On the other hand, the order in which response packets for request packets having the same transaction ID are detected follows (e.g., is matched to and/or corresponds to) the order in which the request packets having the same transaction ID are detected. That is, the order in which the response packets for the request packets detected at the times t0 and t2 with a transaction ID of 0 (for example, the response packets at the times t9 and t11) are detected follows (e.g., is matched to and/or corresponds to) the order in which the corresponding request packets are detected. Accordingly, even response packets for request packets having the same transaction ID can also be properly identified.

In addition to detecting the order of packets transmitted between the master and slave device, the semiconductor device 100 may additionally count the number of request packets for which request packets have yet to be detected. FIG. 2 shows a Multiple Outstanding (MO) count value for a case in which a target transaction ID is 0 and an MO count value for a case in which the target transaction ID is 1 according to at least one example embodiment, but not limited thereto.

For example, when the target transaction ID is 0, an MO count value is increased by 1 to a value of 1 upon the detection of the request packet having a transaction ID of 0 at the time t0, and is increased again by 1 to a value of 2 upon the detection of the request packet having a transaction ID of 0 at the time t2. In other words, the MO count value is incremented by the number of request packets detected by the monitoring device 200 for each desired transaction ID. Then, the MO count value is lowered by 1 to a value of 1 upon the detection of the response packet having a transaction ID of 0 at the time t9 and is lowered again by 1 to a value of 0 upon the detection of the response packet having a transaction ID of 0 at the time t11. In other words, the MO count value is decremented by the number of response packets detected by the monitoring device 200 for each desired transaction ID.

In another example, when the target transaction ID is 1, the MO count value is increased by 1 to a value of 1 upon the detection of the request packet having a transaction ID of 1 at the time t1 and is lowered by 1 to a value of 0 upon the detection of the response packet having a transaction ID of 1 at the time t7.

To compute an MO count value, the semiconductor device 100 may use an MO counter that will be described later with reference to FIG. 3 according to at least one example embodiment.

Latency measurement is useful for (and/or is needed to) debug a channel formed in the semiconductor device 100 and/or to control QoS. Latency may be measured by measuring the amount of time that it takes for a response packet to be generated in response to a request packet in a channel formed between a master device and a slave device. From the viewpoint of the monitoring device 200, the latency may be measured by measuring the amount of time between the detection of a request packet transmission and the detection of a response packet responsive to the request packet. The measured time may be determined to be the latency of the channel, the transaction event, and/or the master device and the slave device.

For example, according to the example illustrated in FIG. 2, the latency of a transaction including the request packet detected at the time t0 with a transaction ID of 0 may be measured to be 10, which is the amount of time from the time t0 (e.g., the time at which the request packet having a transaction ID of 0 is detected by the monitoring device 200) to the time t9 (e.g., the time at which a response packet for the request packet having a transaction ID of 0 is detected by the monitoring device 200). Similarly, the latency of a transaction including the request packet detected at the time t1 with a transaction ID of 1 may be measured to be 7, which is the amount of time from the time t1 (e.g., the time at which the request packet having a transaction ID of 1 is detected by the monitoring device 200) to the time t7 (e.g., the time at which a response packet for the request packet having a transaction ID of 1 is detected by the monitoring device 200). The latency measurement may be output and/or transmitted to one or more destinations for further processing, such as debugging and/or QoS control on the semiconductor device 100.

As mentioned above, if a plurality of transactions are performed in the channel formed in the semiconductor device 100 and a target transaction ID is changed in the middle of tracking the occurrence of an event with regard to a particular transaction ID, the occurrence of an event may not be precisely (and/or properly) tracked. For example, if a target transaction ID is changed from 1 to 0 while tracking the occurrence of an event corresponding to a transaction ID of 1, there is a risk that an invalid value may be set as a latency count value such as, for example, an MO count value and/or an event count value.

Figure 3:
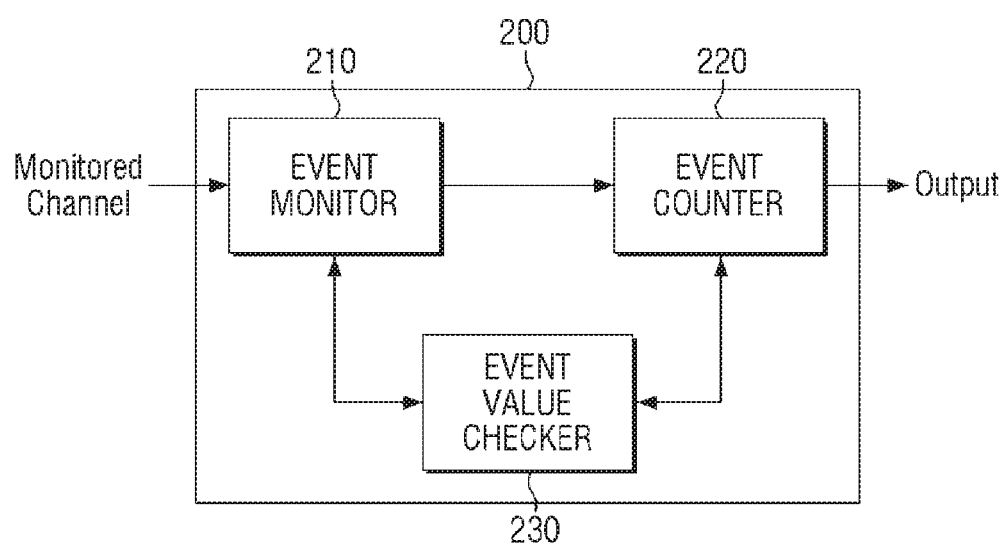
FIG. 3 is a schematic block diagram of a monitoring device of the semiconductor device according to the at least one example embodiment of FIG. 1.

FIG. 3 is a schematic block diagram of a monitoring device of the semiconductor device according to some example embodiments, such as the example embodiment of FIG. 1.

Referring to FIG. 3, a monitoring device 200 includes an event monitor 210, an event counter 220, and/or an event value checker 230, but is not limited thereto. For example, although not specifically illustrated in FIG. 3, the monitoring device 200 may further include an MO counter, etc.

According to at least one example embodiment, the event monitor 210 detects a target request packet that matches a desired (or alternatively, predefined) ID information from among a plurality of request packets that are transmitted over a channel between a master device and a slave device, a master device and a plurality of slave devices, a plurality of master devices and a slave device, a plurality of master devices and a plurality of slave devices, etc. The event monitor 210 may perform event counting on a transaction that matches the desired and/or predefined ID information, among other transactions that are being transmitted over the channel between the master device(s) and the slave device(s).

Although not specifically illustrated in FIG. 3, in some example embodiments, the semiconductor device 100 may further include a configuration module, which receives the desired and/or predefined ID information from outside the monitoring device 200 and provides the desired and/or predefined ID information to the event monitor 210. In some example embodiments, only a transaction that matches the desired and/or predefined ID information, from among other transactions that are being transmitted over a channel formed in the semiconductor device 100, is monitored, and the desired and/or predefined ID information may be ID information configured in advance (or in real-time) by a user or an application and received from outside the monitoring device 200 or the semiconductor device 100. However, the present disclosure is not limited to these example embodiments. That is, the desired and/or predefined ID information may be stored in a particular IP block in the monitoring device 200 and/or the semiconductor device 100.

In some example embodiments, the desired and/or predefined ID information, which is provided by the configuration module, may include at least one of transaction ID information, transaction attribute information, transaction data values, etc. For example, the transaction ID information may include unique ID information for identifying the transaction packet, a source device (e.g., a master device) and/or a destination device (e.g., a slave device), the transaction attribute information may include attribute information related to the transaction, such as the burst length attribute information, cache snooping type attribute information, etc., and the transaction data values may include data associated with the transaction (e.g., the data requested for, etc.).

The event counter 220 counts the number of events of a transaction including a desired event, such as the transmission of a target request packet. In some example embodiments, in the case in which a count of events that occur in the channel between the master device and the slave device is set as a latency count, the event counter 220 may also operate as a latency counter. The event counter 220 outputs and/or transmits the results of the event counting (e.g., the output of the event counter 220) to one or more destinations for further processing, such as debugging and/or QoS control on the semiconductor device 100. The output of the event counter may be used for performance evaluation, response testing, equipment performance verification, software program performance verification, etc., at the destination, which may be a CPU or other local processing device, or a networked device, in connection with an operating system, programmable logic unit, debugging software, QoS software, compiler, run-time execution environment, test platform, etc.

The MO counter counts the number of outstanding corresponding events, such as the transmission of request packets corresponding to the transmission of target request packets. For example, the MO counter may count the number of outstanding request packets which are request packets for which response packets have yet to be detected, from among the plurality of request packets, but the example embodiments are not limited thereto.

The event value checker 230 determines whether the count value of the MO counter, i.e., an MO count value, is valid, the validation process described in detail below. Additionally, if the MO count value is determined to be invalid, the event value checker 230 transmits a reset signal to the MO counter. Also, if the MO count value is invalid, the event value checker 230 transmits a reset signal to the event counter 220.

Figure 4:
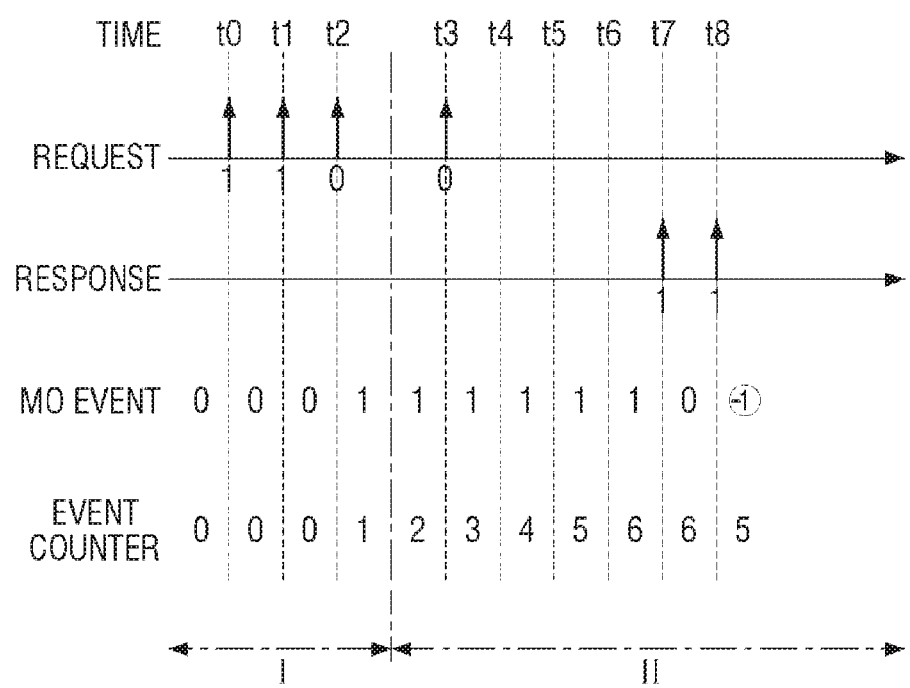
FIGS. 4 and 5 are timing diagrams for explaining an operating method of a semiconductor device, according to some example embodiments of the present disclosure.
Figure 5:
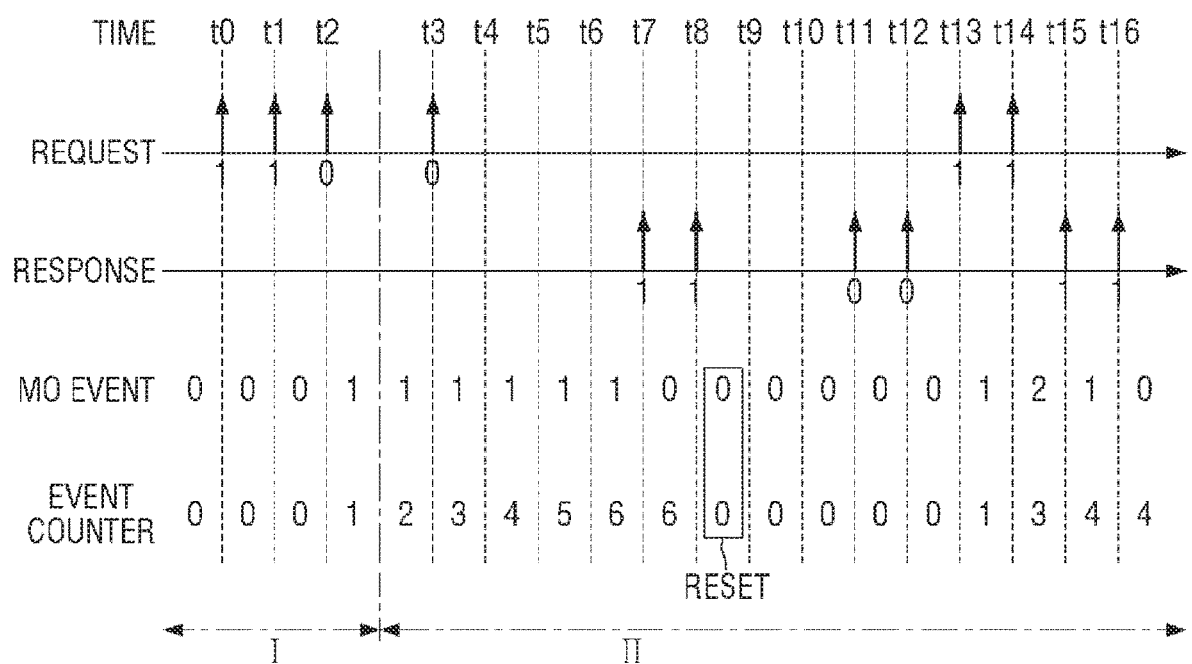

FIGS. 4 and 5 are timing diagrams for explaining an operating method of a semiconductor device, according to at least one example embodiment of the present disclosure.

In FIG. 4, it is assumed that there is a channel between a master device and a slave device that is being monitored by the monitoring device 200. During the first period I of FIG. 4, a target transaction ID is 0 between the period of time t0 to a time t2. During a second period II of FIG. 4, the target transaction ID is 1 between the period from time t3 to a time t8. For example, it is assumed in FIG. 4 that the monitoring device 200 receives instructions to change the target transaction ID from 0 to 1 from the IP block 110 (for example, a CPU) in the process of performing the monitoring with regard to the target transaction ID of 0.

In some example embodiments, the master device may correspond to a first IP block provided in an SoC, and the slave device may correspond to a second IP block provided in the same SoC, but the example embodiments are not limited thereto.

Since the transaction ID of request packets detected at the times t0 and t1 is 1, the request packets detected at the times t0 and t1 are excluded from the event counting. On the other hand, since the transaction ID of a request packet detected at the time t2 is 0, the request packet detected at the time t2 is subjected to event counting (e.g., included in the event counting).

Since the target transaction ID is changed to 1 in the second period II in FIG. 4, the target packet detected at the time t3 (e.g., the packet having a transaction ID of 0) is excluded from the event counting. An MO count value is lowered by 1 to 0 in response to the detection of a response packet having a transaction ID of 1 at the time t7, and is lowered again by 1 to −1 in response to the detection of another response packet having a transaction ID of 1 at the time t8. The MO count value represents the number of outstanding request packets, which are request packets for which response packets have yet to be detected. Thus, the negative MO count value is determined to be invalid by the event value checker 230 in this situation. Also, an event count value of 5 may be determined to be invalid as well by the event value checker 230.

Referring to FIG. 5, the count value of the MO counter and the count value of the event counter 220 are corrected upon the detection of an invalid MO count value and an invalid event count value according to at least one example embodiment.

More specifically, the event value checker 230 determines whether the count value of the MO counter, i.e., the MO count value, is valid. If the event value checker 230 determines that the MO count value is invalid, for example, if the MO count value is negative, the event value checker 230 transmits a reset signal to the MO counter. Additionally, if the MO) count value is invalid, the event value checker 230 may also determine that the count value of the event counter 220, i.e., the event count value, is also invalid and accordingly transmits a reset signal to the event counter 220 as well.

For example with regard to FIG. 5, after the time t8, the MO) count value and the event count value are both initialized to 0. Since the target transaction ID is 1 during the second period II in FIG. 5, the response packets detected at times t11 and t12 are ignored because their transaction IDs are 0, and therefore are not relevant and/or do not correspond with the current and/or desired target transaction ID. Additionally, the request packets detected at times t13 and t14 are counted in (e.g., increment the MO counter and the event counter) because the transaction IDs corresponding to those request packets correspond to the current and/or desired target transaction ID.

In this manner, if invalid data is generated due to the target transaction ID being changed in the process of performing event counting in the channel between the master device and the slave device, valid data can be quickly acquired simply by resetting the MO counter and the event counter 220 of the monitoring device 200, instead of resetting the entire monitoring device 200 and/or discarding the invalid data. Also, from a user's point of view, valid data can be acquired using this method without incurring the risk of having any invalid data being output.

In addition, a target transaction to be subjected to (and/or selected for) event counting can be customized and/or configured, and thus, tasks such as debugging and QoS control can be performed in a properly customized manner for each individual application environment. For example, by setting an ID value for identifying a particular device as a target transaction ID for event counting, event counting can be performed on just the one or more transactions having the transaction ID(s) desired by the user, while ignoring transaction that are not relevant, desired and/or required by the user. As an example, a user may desire to monitor the transactions between specific IP blocks, specific processing units, specific SoC components, and/or transactions involving a particular software program, functions, classes, APIs, etc., at the on-chip interconnect level and may do so utilizing at least one of the example embodiments.

Figure 6:
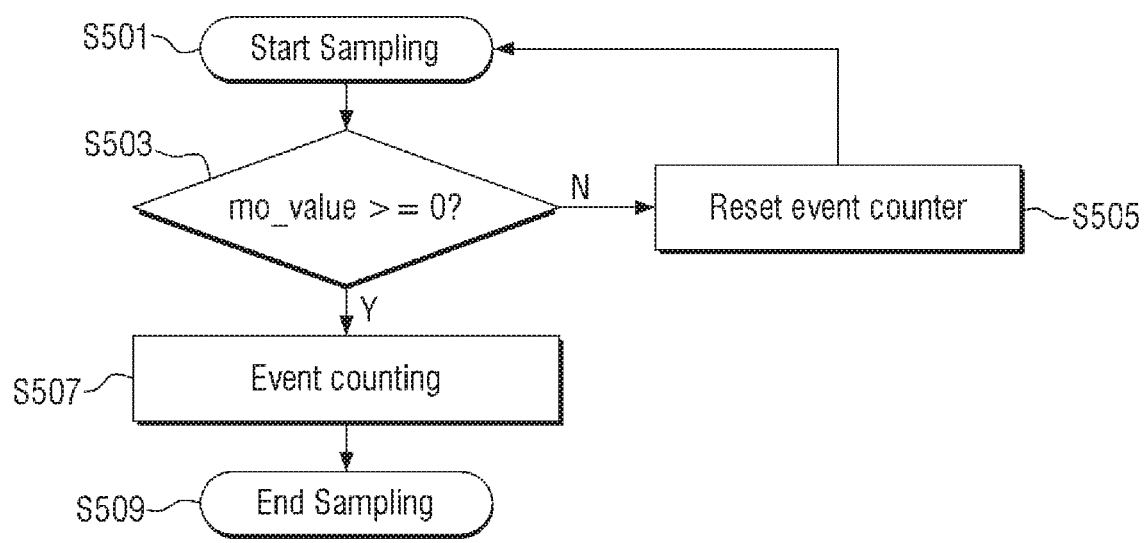
FIG. 6 is a flowchart illustrating the operating method according to the example embodiments of FIGS. 4 and 5.

FIG. 6 is a flowchart illustrating the operating method according to the at least one example embodiment of FIGS. 4 and 5.

Referring to FIG. 6, the operating method according to at least one example embodiment includes monitoring a plurality of request packets and a plurality of response packets that are being transmitted between a master device and a slave device. However, the example embodiments are not limited thereto and may involve any combination of master devices and slave devices.

At S501, the sampling of the plurality of request packets and the plurality of response packets is initiated. More specifically, a target request packet that matches a desired and/or predefined transaction ID information is detected from among the plurality of request packets, and event counting is performed until a target response packet for the target request packet is detected.

At S503, a determination is made as to whether an MO count value of the MO counter is valid while performing the event counting. If the MO count value is valid, then the event counting is further continued (S507).

If the MO count value is invalid, the MO counter and the event counter 220 are reset, as well as any latency measurement, (S505), and sampling is performed again (S501).

In some example embodiments, in the case in which the count of events that occurs in the channel between the master device and the slave device is measured as a latency count, an average latency and a peak latency that are computed based on a plurality of latency values may be used to perform tasks such as debugging and/or QoS control on the semiconductor device 100 in terms of performance evaluation, response testing, equipment performance verification, software program performance verification, etc.

Even in this case, if invalid data is generated due to the target transaction ID being changed in the process of performing event counting in the channel between the master device and the slave device, valid data can be quickly acquired simply by resetting the MO counter and the event counter 220 of the monitoring device 200, instead of resetting the entire monitoring device 200 and/or discarding the invalid data. Also, from a user's point of view, specific valid data may be acquired without the risk of any invalid data being output.

In addition, a target transaction to be subjected to event counting can be customized, and thus, tasks such as debugging and/or QoS control can be performed in a properly customized and/or configured manner for various individual application environments. For example, by setting an ID value for identifying a particular device, particular software program, or the like, as a target transaction ID for event counting, event counting can be performed only on transactions having a transaction ID desired by a user.

Figure 7:
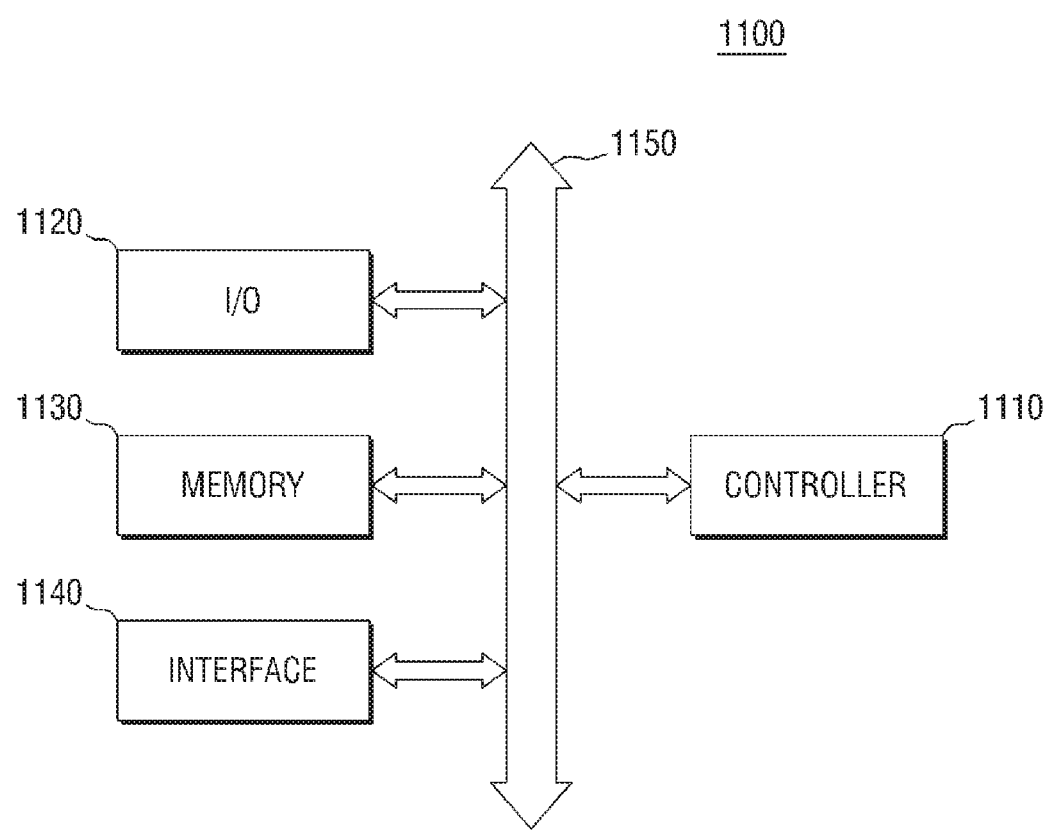
FIG. 7 is a block diagram of a semiconductor system to which a semiconductor device and/or an operating method of the semiconductor device, according to some example embodiments of the present disclosure, are applicable.

FIG. 7 is a block diagram of a semiconductor system to which a semiconductor device and/or an operating method of the semiconductor device, according to some example embodiments of the present disclosure, are applicable.

Referring to FIG. 7, a semiconductor system 1100 may include a controller 1110, an input/output (I/O) device 1120, a memory device 1130, an interface 1140, and a bus 1150. The controller 1110, the I/O device 1120, the memory device 1130, and/or the interface 1140 may be connected to one another via the bus 1150. The bus 1150 may be a path via which data is transmitted.

The controller 1110 may include at least one of a microprocessor, a digital signal processor, a microcontroller, and/or a logic element performing similar functions to a microprocessor, a digital signal processor, or a microcontroller. Examples of the I/O device 1120 include a keypad, a keyboard, a display device, and the like. The memory device 1130 may store data and/or commands. The interface 1140 transmits data to or receives data from a communication network. The interface 1140 may be a wired or wireless interface. Examples of the interface 1140 include an antenna, a wired or wireless transceiver, and the like.

Although not specifically illustrated, the semiconductor system 1100 may also include an operating memory for improving the operation of the controller 1110, such as a high-speed dynamic random access memory (DLRM) and/or static random access memory (SRAM).

A semiconductor device according to some example embodiments of the present disclosure may be provided inside the memory device 1130 or may be provided as part of the controller 1110 and/or the I/O device 1120.

The semiconductor system 1110 may be applicable to a Personal Digital Assistant (PDA), a personal computer, a portable computer, a web tablet, a wireless phone, a smart phone, a mobile phone, a digital music player, a memory card, or any type of electronic product capable of transmitting and/or receiving information in a wired and/or wireless environment.

Figure 8:
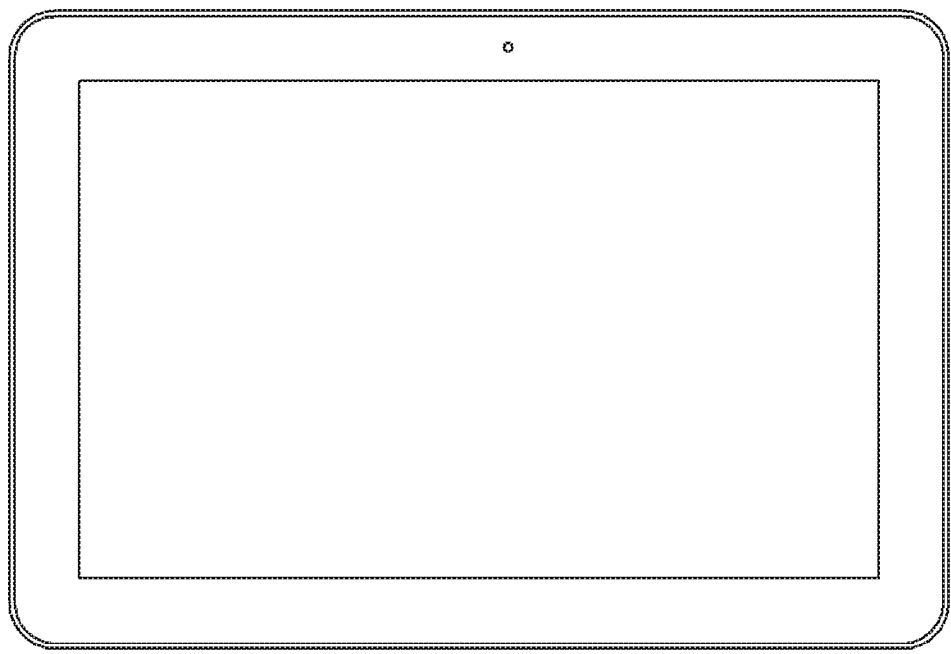
FIGS. 8 through 10 are schematic views illustrating example semiconductor systems to which a semiconductor device and/or an operating method of the semiconductor device, according to some example embodiments of the present disclosure, are applicable.
Figure 9:
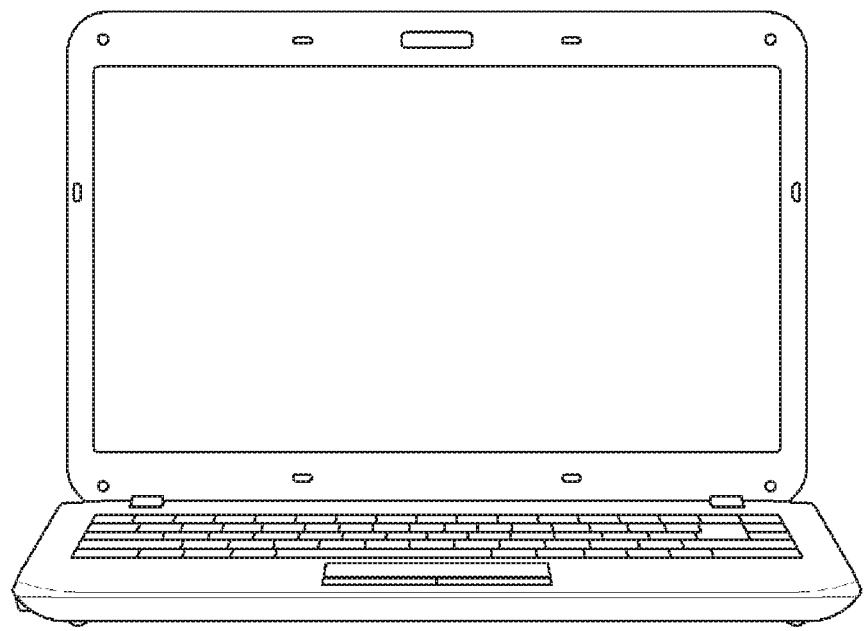
Figure 10:
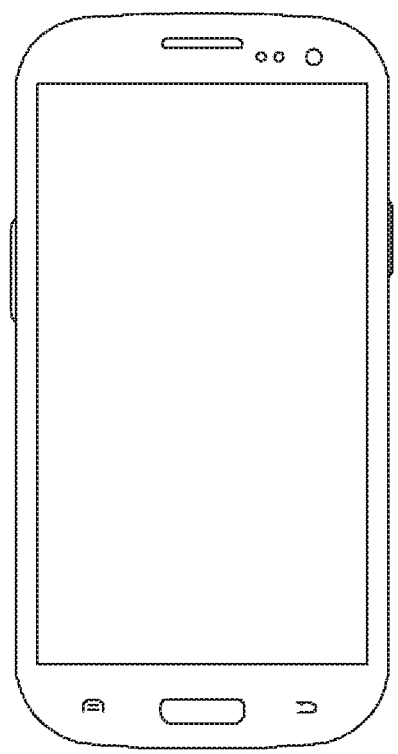

FIGS. 8 through 10 are schematic views illustrating various example semiconductor systems to which a semiconductor device and/or an operating method of the semiconductor device, according to some example embodiments of the present disclosure, are applicable.

More specifically, FIG. 8 illustrates a tablet PC 1200, FIG. 9 illustrates a notebook computer 1300, and FIG. 10 illustrates a smartphone 1400. At least one semiconductor device according to some example embodiments of the present disclosure may be used in the tablet PC 1200, the notebook computer 1300, and the smartphone 1400, but the example embodiments are not limited thereto.

For example, a semiconductor device according to some example embodiments of the present disclosure may also be used in various IC devices other than those set forth herein.

That is, while the tablet PC 1200, the notebook computer 1300, and the smartphone 1400 have been described herein as examples of the semiconductor system, the present disclosure is not limited thereto.

In some example embodiments, the semiconductor system may also be provided as a personal computer (PC), an Ultra Mobile PC (UMPC), a work station, a net-book computer, a PDA, a portable computer, a wireless phone, a mobile phone, an electronic-book (e-book), a Portable Multimedia Player (PMP), a gaming console, a portable game console, a personal navigation device, a black box, a digital camera, a 3-dimensional (3D) television set, a digital audio recorder, a digital audio player, a digital picture recorder, a digital picture player, a digital video recorder, a digital video player, a virtual reality (VR) device, an augmented reality (AR) device, a smart device, a wearable device, an Internet of Things (IoT) device, etc.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

As is traditional in the field of the inventive concepts, various example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar processing devices, they may be programmed using software (e.g., microcode) to perform various functions discussed herein and may optionally be driven by firmware and/or software, thereby transforming the microprocessor or similar processing devices into a special purpose processor. Additionally, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

What is claimed is:

1. An operating method of a semiconductor device, comprising:
    monitoring a plurality of request packets and a plurality of response packets transmitted between at least one master device and at least one slave device, the at least one master device and the at least one slave device included in the semiconductor device;
    detecting a target request packet that matches desired identification (ID) information from among the plurality of request packets;
    counting a number of events of a transaction based on the target request packet using an event counter;
    counting a number of request packets whose corresponding response packets have not been detected from among the plurality of request packets using a Multiple Outstanding (MO) counter;
    determining whether an MO count value of the MO counter is valid; and
    in response to the MO count value being invalid, resetting the event counter.

2. The operating method of claim 1, wherein the resetting the event counter comprises resetting the MO counter.

3. The operating method of claim 1, wherein the desired ID information includes at least one of transaction ID information and transaction attribute information.

4. The operating method of claim 3, wherein the transaction ID information includes unique ID information for identifying the at least one master device or the at least one slave device.

5. The operating method of claim 3, wherein the transaction attribute information includes at least one of burst length attribute information and cache snooping type attribute information.

6. The operating method of claim 1, wherein:
    the at least one master device is an Intellectual Property (IP) block provided in a System-on-Chip (SoC); and
    the at least one master device and the at least one slave device exchange the plurality of request packets and the plurality of response packets via an On-Chip Interconnect (OCI).

7. The operating method of claim 6, further comprising:
    receiving the desired ID information, the desired ID information being set by a user or an application external to the SoC.

8. The operating method of claim 1, further comprising:
    acquiring a first latency value of a first transaction and a second latency value of a second transaction, the second transaction being different from the first transaction; and
    computing an average latency and a peak latency based on the first latency value and the second latency value.

9. The operating method of claim 8, further comprising:
    debugging a channel between the at least one master device and the at least one slave device by using the average latency and the peak latency.

10. The operating method of claim 9, further comprising:
    controlling a Quality-of-Service (QoS) of the channel based on the average latency and the peak latency.

11. An operating method of a semiconductor device, comprising:
    monitoring a plurality of request packets and a plurality of response packets between a first intellectual property (IP) block and a second IP block, the first IP block and second IP block included in a System-on-Chip (SoC);
    receiving desired first ID information and desired second ID information;
    counting a number of events of a first transaction from the plurality of request packets and the plurality of response packets that matches the desired first ID information using an event counter;

counting a number of events of a second transaction from the plurality of request packets and the plurality of response packets that that matches the desired second ID information using the event counter;

counting a number of outstanding request packets whose corresponding response packets have not been detected from among the plurality of request packets by using Multiple Outstanding (MO)counter;

determining whether an MO count value of the MO counter is valid; and in response to the MO count value being invalid, resetting the event counter.

12. The operating method of claim 11, wherein the resetting the event counter comprises resetting the MO counter.

13. The operating method of claim 11, wherein the desired ID information includes at least one of transaction ID information and transaction attribute information.

14. The operating method of claim 13, wherein the transaction ID information includes unique ID information for identifying the first IP block or the second IP block.

15. The operating method of claim 13, wherein the transaction attribute information includes at least one of burst length attribute information and cache snooping type attribute information.

16. A method of monitoring a channel of a semiconductor device, comprising:

sampling packet transmissions over the channel of the semiconductor device, the packet transmissions including a plurality of request packets and a plurality of response packets;

detecting whether a request packet from the sampled plurality of request packets matches a target request packet based on a desired transaction ID;

detecting whether a response packet from the sampled plurality of response packets matches a target response packet based on the desired transaction ID;

updating a count of a number of transaction events completed based on the detecting of the request packet and the detecting of the response packet;

determining whether the count of the number of transaction events completed is valid; and outputting the count of the number of transaction events to a debugging destination based on results of the determining.

17. The method of claim 16, wherein the determining includes determining that the count of the number of transaction events is valid if the count is greater than or equal to 0; and the outputting includes resetting the count of the number of transaction events completed if the count of the number of transaction events completed is invalid.

18. The method of claim 16, wherein the channel includes at least a first intellectual property (IP) block and a second IP block; and the sampling includes monitoring packet transmissions between the first IP block and the second IP block.

19. The method of claim 16, further comprising:

measuring a time between the detecting the request packet that matches the target request packet and the detecting the response packet that matches the target response packet; and determining a latency associated with the channel based on the measured time.

20. The method of claim 19, wherein the outputting includes resetting the count of the number of transaction events completed and a latency measurement, if the count of the number of transaction events completed is invalid.

* * * * *